United States Patent
Yoo et al.

(10) Patent No.: US 8,760,410 B2
(45) Date of Patent: Jun. 24, 2014

(54) APPARATUS AND METHOD FOR IMPROVEMENT OF USABILITY OF TOUCH SCREEN

(75) Inventors: Byung-in Yoo, Seoul (KR); Seong-woon Kim, Yongin-si (KR); Yeun-bae Kim, Seongnam-si (KR); Nam-woo Kim, Hanam-si (KR); Kwon-ju Yi, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 927 days.

(21) Appl. No.: 11/979,929

(22) Filed: Nov. 9, 2007

(65) Prior Publication Data
US 2008/0180402 A1      Jul. 31, 2008

(30) Foreign Application Priority Data

Jan. 25, 2007   (KR) .................. 10-2007-0007972

(51) Int. Cl.
*G06F 3/041* (2006.01)
(52) U.S. Cl.
USPC .......................................... 345/173; 345/174
(58) Field of Classification Search
USPC .................... 345/173, 179; 701/207, 213
See application file for complete search history.

(56) References Cited

U.S. PATENT DOCUMENTS

| | | | |
|---|---|---|---|
| 1,136,749 A * | 4/1915 | Wright | |
| 5,854,625 A | 12/1998 | Frisch et al. | 345/173 |
| 6,278,443 B1 * | 8/2001 | Amro et al. | 345/173 |
| 6,392,638 B2 | 5/2002 | Hanajima et al. | |
| 7,239,305 B1 * | 7/2007 | Nakano et al. | 345/179 |
| 7,268,772 B2 * | 9/2007 | Kawai et al. | 345/173 |
| 7,489,306 B2 | 2/2009 | Kolmykov-Zotov et al. | |
| 7,656,393 B2 * | 2/2010 | King et al. | 345/173 |
| 2002/0008691 A1 | 1/2002 | Hanajima et al. | |
| 2002/0177944 A1 * | 11/2002 | Ihara et al. | 701/208 |
| 2003/0146905 A1 | 8/2003 | Pihlaja | |
| 2004/0196267 A1 * | 10/2004 | Kawai et al. | 345/173 |
| 2005/0046621 A1 * | 3/2005 | Kaikuranta | 345/173 |
| 2005/0168488 A1 * | 8/2005 | Montague | 345/659 |
| 2006/0022955 A1 * | 2/2006 | Kennedy | 345/173 |
| 2006/0132460 A1 * | 6/2006 | Kolmykov-Zotov et al. | 345/173 |
| 2006/0178827 A1 * | 8/2006 | Aoyama | 701/211 |
| 2006/0244735 A1 * | 11/2006 | Wilson | 345/173 |
| 2007/0146342 A1 | 6/2007 | Medler | |

FOREIGN PATENT DOCUMENTS

| | | |
|---|---|---|
| EP | 0653696 | 5/1995 |
| EP | 1191430 | 3/2002 |
| EP | 1674976 | 6/2006 |
| JP | 07-104914 | 4/1995 |

(Continued)

OTHER PUBLICATIONS

U.S. Appl. No. 11/367,749, Apr. 1915.*

(Continued)

*Primary Examiner* — Claire X Pappas
*Assistant Examiner* — Sepideh Ghafari
(74) *Attorney, Agent, or Firm* — Staas & Halsey LLP

(57) ABSTRACT

Provided are an apparatus and method for improving usability of a touch screen. The apparatus includes a touch sensing unit that senses a first touch and a second touch and detects the touched locations of the sensed touches, a pointer setting unit that sets a pointer to the detected location of the first touch, and a coordinate transforming unit that transforms movement of a touched location, which is caused by movement of the second touch, into movement of a location of the pointer.

24 Claims, 15 Drawing Sheets

(56) References Cited

FOREIGN PATENT DOCUMENTS

| | | |
|---|---|---|
| JP | 9-251347 | 9/1997 |
| JP | 11-203044 | 7/1999 |
| JP | 11-338628 | 12/1999 |
| JP | 2004-110388 | 4/2004 |
| JP | 2006-179006 | 7/2006 |
| JP | 2006-126997 | 5/2007 |
| KR | 10-2004-0081697 | 9/2004 |
| KR | 10-2006-0010579 | 2/2006 |

OTHER PUBLICATIONS

Extended European Search Report, mailed Jun. 10, 2009, in corresponding European Application No. 08100613.2 (4 pp.).
European Patent Office Communication dated Apr. 1, 2011, issued in European Patent Application No. 08100613.2-2224.
Chinese Office Action dated Oct. 31, 2012, from Chinese Patent Application No. 200810003567.9.
Japanese Office Action dated Sep. 25, 2012, from Japanese Patent Application No. 2008-014719.

* cited by examiner

APPARATUS AND METHOD FOR IMPROVEMENT OF USABILITY OF TOUCH SCREEN

CROSS-REFERENCE TO RELATED APPLICATION

This application claims priority from Korean Patent Application No. 10-2007-0007972 filed on Jan. 25, 2007 in the Korean Intellectual Property Office, the disclosure of which is incorporated herein by reference in its entirety.

BACKGROUND OF THE INVENTION

1. Field of the Invention

The present invention relates to an apparatus and method for improving usability of a touch screen, and more particularly, to an apparatus and method for improving usability of a touch screen, which are capable of preventing a desired screen image displayed on a location based service (LBS) apparatus from being partially hidden by a part of a user's body, such as a finger, or a tool, such as a stylus pen, and precisely controlling the operation of a pointer.

2. Description of the Related Art

Location based services (LBS) indicate various types of services that provide a terminal user with location-related information from a geographic information system (GIS), a global positioning system (GPS), or Telematics, based on the location of a mobile communication terminal, such as a mobile phone or a personal digital assistant (PDA). An LBS employs the triangular network method in which a current location is detected simultaneously by 3 base stations, or a GPS-based method. LBSs have recently been applied to the fields of location information and traffic navigation, and further, to the field of private sector services, such as mobile advertisements, mobile coupons, travel information, vehicle diagnosis supports, emergency operations, and taxi call services.

FIGS. 1A and 1B illustrate that a map is displayed on a conventional LBS apparatus 110 through map browsing.

Here, it is assumed that the LBS apparatus 110 illustrated in FIGS. 1A and 1B employs a touch screen technique in which a user can move and search for a map and refer to information regarding a specific location on the map by touching the LBS apparatus 110. As illustrated in FIG. 1A, a map is displayed on a screen 111 of the LBS apparatus 110, and a user can see the latitude, longitude, name, and address of a specific location 111a on the map by touching the location 111a of the map on the screen 111.

In this case, as illustrated in FIG. 1B, not only the location 111a but also neighbor locations are hidden by a part of the body of the user, e.g., a finger 120, which touches the location 111a.

Also, as described above, LBSs have been recently, actively applied to private sectors, thus increasing demand for LBS apparatuses. Further, as the sizes of digital apparatuses become smaller and smaller, it is quite difficult to delicately manipulate a touch screen, which is accordingly becoming smaller and smaller, by part of a user's body, e.g., the finger 120.

SUMMARY OF THE INVENTION

The present invention provides an apparatus and method for improving usability of a touch screen, which are capable of preventing part of a user's body, e.g., a finger, from obstructing a user's field of vision in a location based service (LBS) apparatus.

The present invention also allows a user to precisely move and search for a map on an LBS apparatus with a touch screen.

These and other objects of the present invention will be described in or be apparent from the following description of the preferred embodiments.

According to an aspect of the present invention, there is provided an apparatus for improving usability of a touch screen, the apparatus including a touch sensing unit that senses a first touch and a second touch and detects the locations of the sensed touches, a pointer setting unit that sets a pointer to the detected location of the first touch, and a coordinate transforming unit that transforms movement of a touched location, which is caused by movement of the second touch, into movement of the location of the pointer.

According to another aspect of the present invention, there is provided a method of improving usability of a touch screen, the method comprising: sensing a first touch, and detecting a touched location of the sensed first touch, setting a pointer to the detected location of the first touch, sensing a second touch, and detecting a touched location of the sensed second touch, and transforming movement of a touched location, which is caused by movement of the second touch, into movement of a location of the pointer.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

Figure 1A:
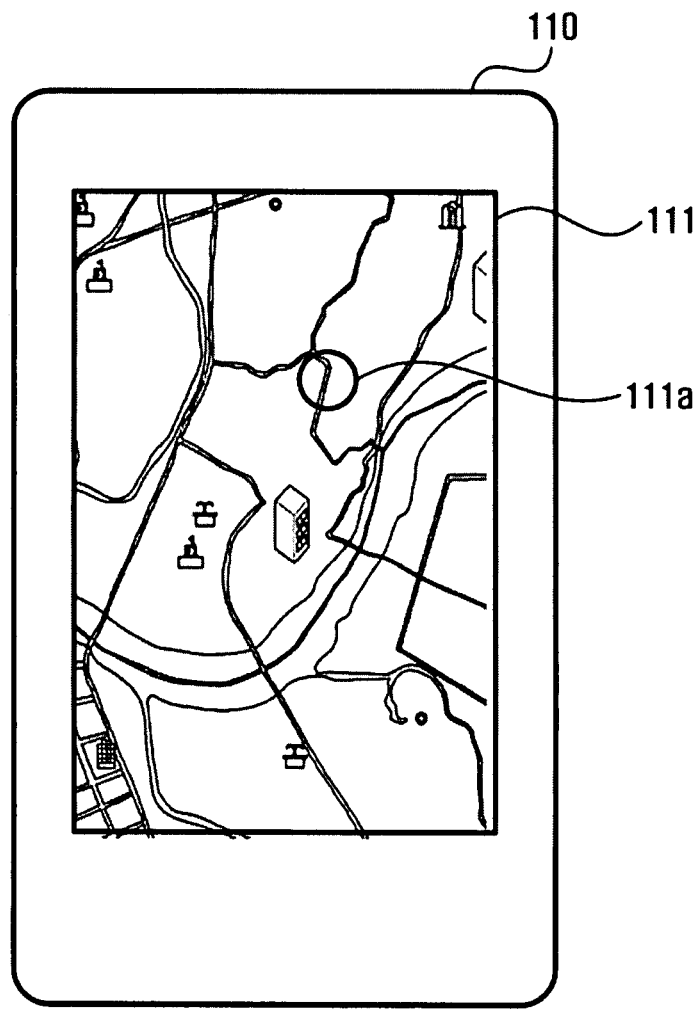
FIGS. 1A and 1B illustrate that a map is displayed on a conventional location based service (LBS) apparatus through map browsing.
Figure 1B:
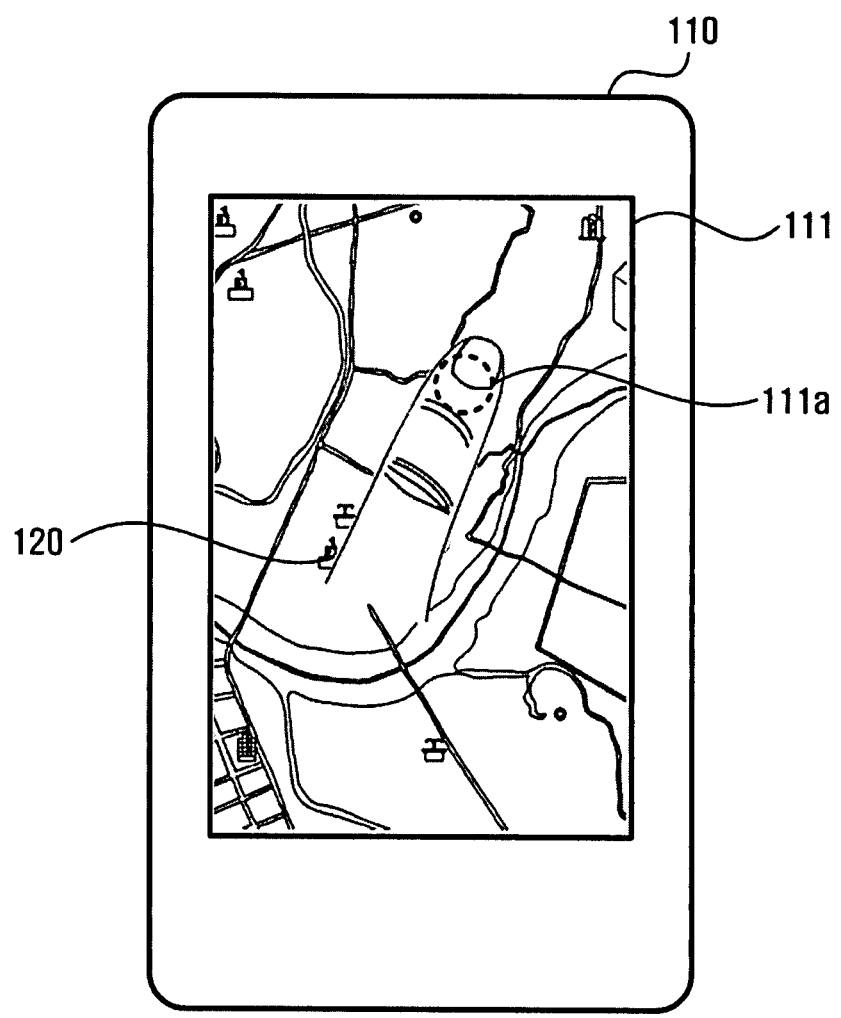

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims.

Like reference numerals refer to like elements throughout the specification.

The present invention is described hereinafter with reference to flowchart illustrations of methods according to exemplary embodiments of the invention.

It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to create means for implementing the functions specified in the flowchart block or blocks.

These computer program instructions may also be stored in a computer usable or computer-readable memory that can direct a computer or other programmable data processing apparatus to function in a particular manner, such that the instructions implement the function specified in the flowchart block or blocks.

The computer program instructions may also be loaded onto a computer or other programmable data processing apparatus to cause a series of operational steps to be performed on the computer or other programmable apparatus to produce a computer implemented process for implementing the functions specified in the flowchart block or blocks.

In addition, each block may represent a module, a segment, or a portion of code, which may comprise one or more executable instructions for implementing the specified logical functions. It should also be noted that in other implementations, the functions noted in the blocks may occur out of the order noted or in different configurations of hardware and software. For example, two blocks shown in succession may, in fact, be executed substantially concurrently, or the blocks may sometimes be executed in the reverse order, depending on the functionality involved.

In exemplary embodiments of the present invention, it is assumed that a map is displayed on a touch screen of a location based service (LBS) apparatus and a user selects a desired location on the map. Hereinafter, exemplary embodiments of the present invention will be described in detail with reference to the accompanying drawings.

Figure 2A:
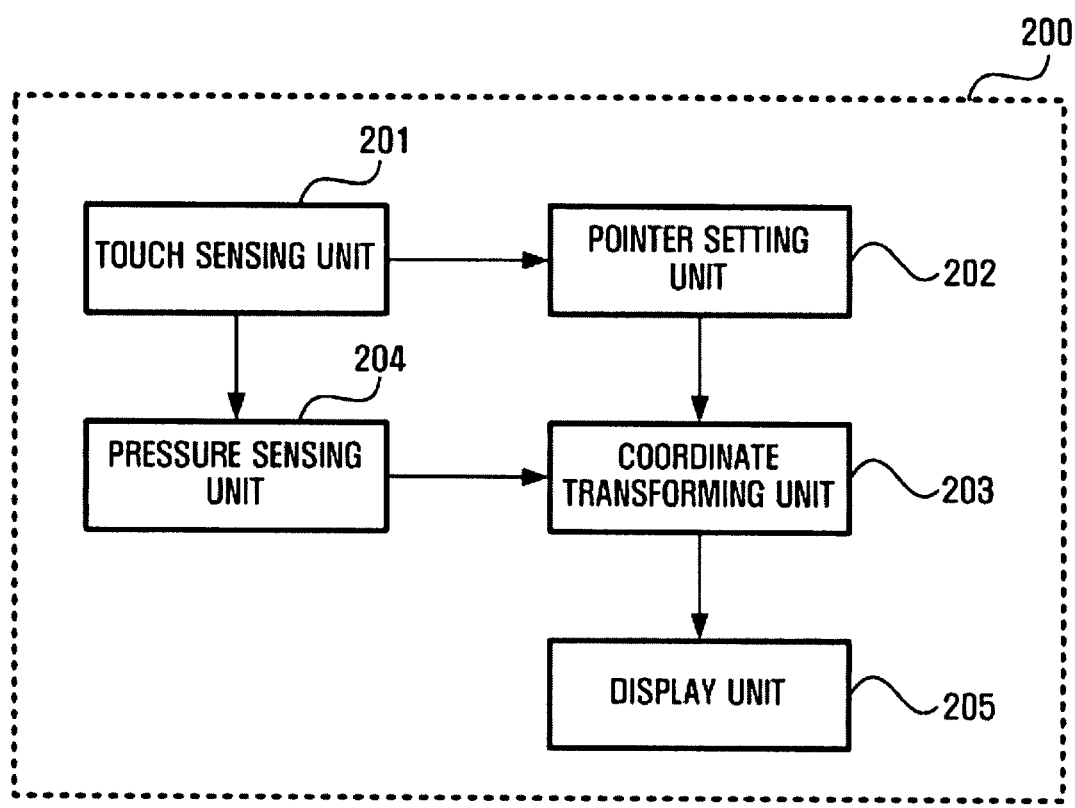
FIG. 2A is a block diagram of an apparatus for improving usability of a touch screen, according to an embodiment of the present invention.

FIG. 2A is a block diagram of an apparatus for improving usability of a touch screen, according to an embodiment of the present invention.

Figure 2B:
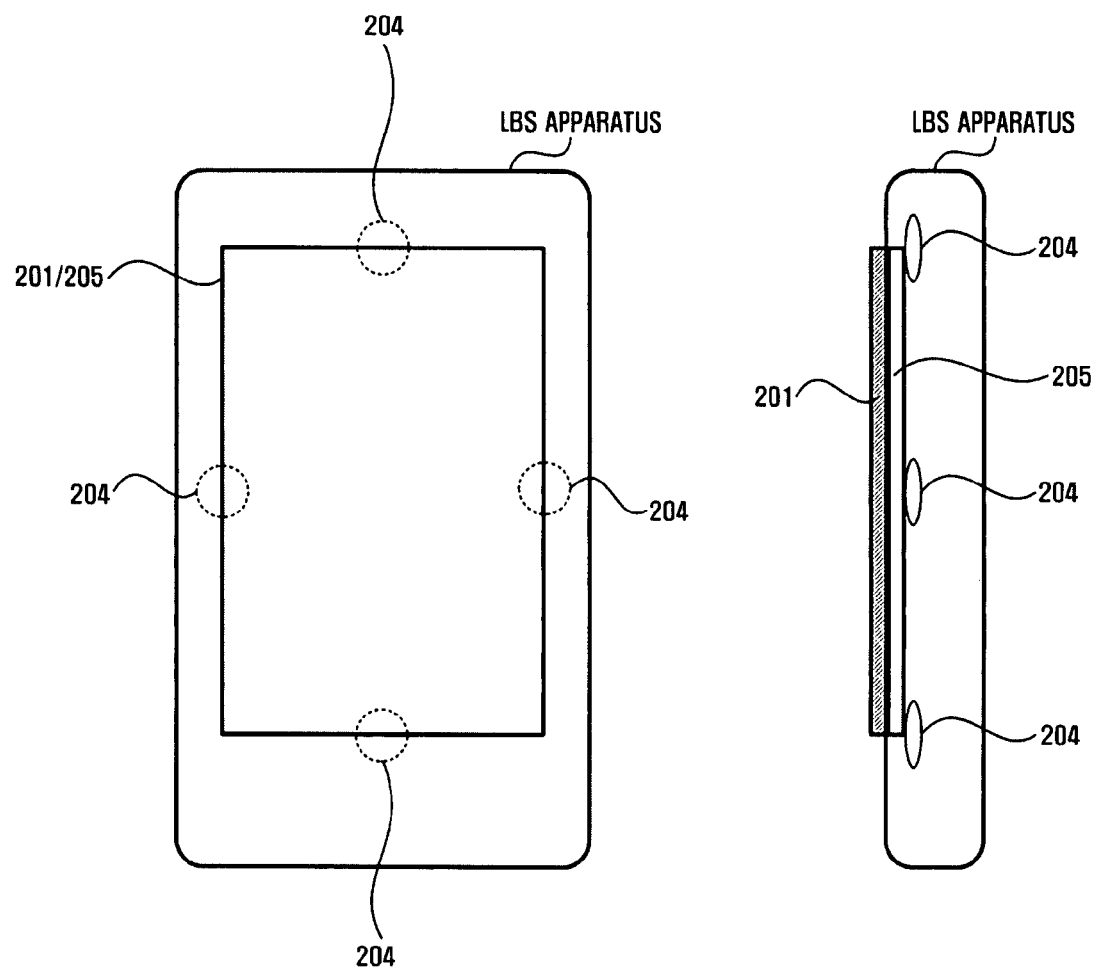
FIG. 2B is a diagram illustrating a case where an apparatus for improving usability of a touch screen is actually applied to an LBS apparatus, according to an embodiment of the present invention.

Referring to FIG. 2A, an apparatus 200 for improving usability of a touch screen according to an embodiment of the present invention, includes a touch sensing unit 201 that senses a first touch and a second touch and detects the touched locations of the sensed touches, a pointer setting unit 202 that sets a pointer to the touched location of the first touch, which is detected by the touch sensing unit 201, a coordinate transforming unit 203 that transforms movement of a touched location, which is caused by movement of the second touch, into movement of the location of the pointer, a pressure sensing unit 204 that senses a pressure applied to the touched location detected by the touch sensing unit 201 to instruct an operation corresponding to the sensed pressure to be performed, and a display unit 205 that displays movement of the location of the pointer and the operation corresponding to the sensed pressure. As illustrated in FIG. 2B, the apparatus 200 of FIG. 2A can be applied to LBS apparatuses.

The touch sensing unit 201 may include a touch sensor in order to sense a user's touch, and be located on the top of the display unit 205 which is a screen of the LBS apparatus. The pressure sensing unit 204 senses a pressure applied to the touched location. One or more pressure sensing units 204 may be located at the bottom of the display unit 205.

Meanwhile, the term 'unit', as used in FIG. 2A, means, but is not limited to, a software or hardware component, such as a Field Programmable Gate Array (FPGA) or Application Specific Integrated Circuit (ASIC), which performs certain tasks.

A unit may advantageously be configured to reside on the addressable storage medium and configured to execute on one or more processors.

Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

The functionality provided for in the components and units may be combined into fewer components and units or further separated into additional components and units.

First, the touch sensing unit 201 of the apparatus 200 of FIG. 2A senses the first touch and the second touch, and detects the touched locations of the sensed touches.

The first touch indicates the user's touch of a desired location on the screen of the LBS apparatus by using an object. Here, the object means a part of the body of the user, such as a finger, or a tool, such as a stylus pen.

Hereinafter, for convenience of explanation, it is assumed in embodiments of the present invention that a part of the body of the user, e.g., a finger, is used in order to apply an input to an LBS apparatus. The second touch and the touch sensing unit 201 will be described in greater detail when describing the other elements 202 through 205 illustrated in FIG. 2A.

Figure 3A:
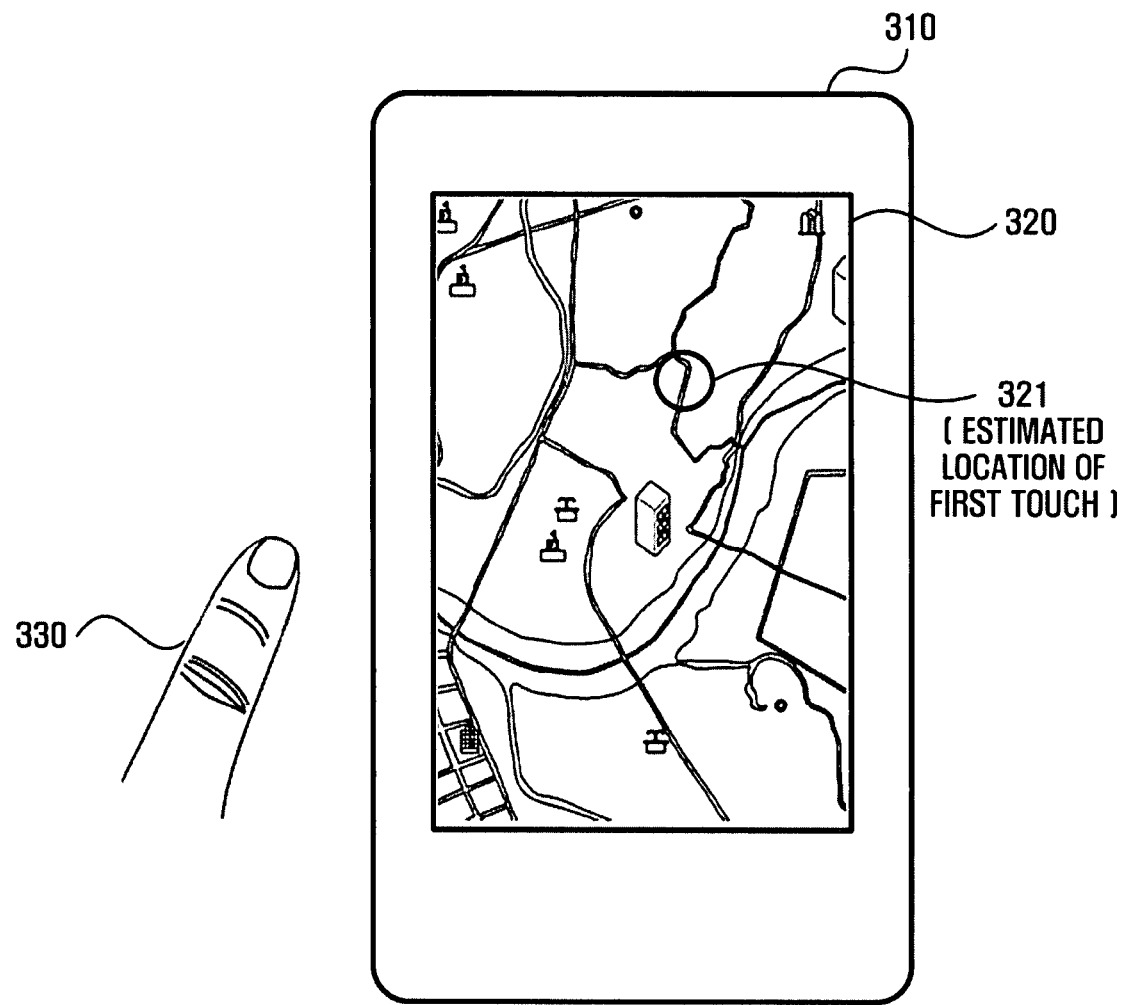
FIGS. 3A and 3B are diagrams illustrating a first touch made by a user according to an embodiment of the present invention.
Figure 3B:
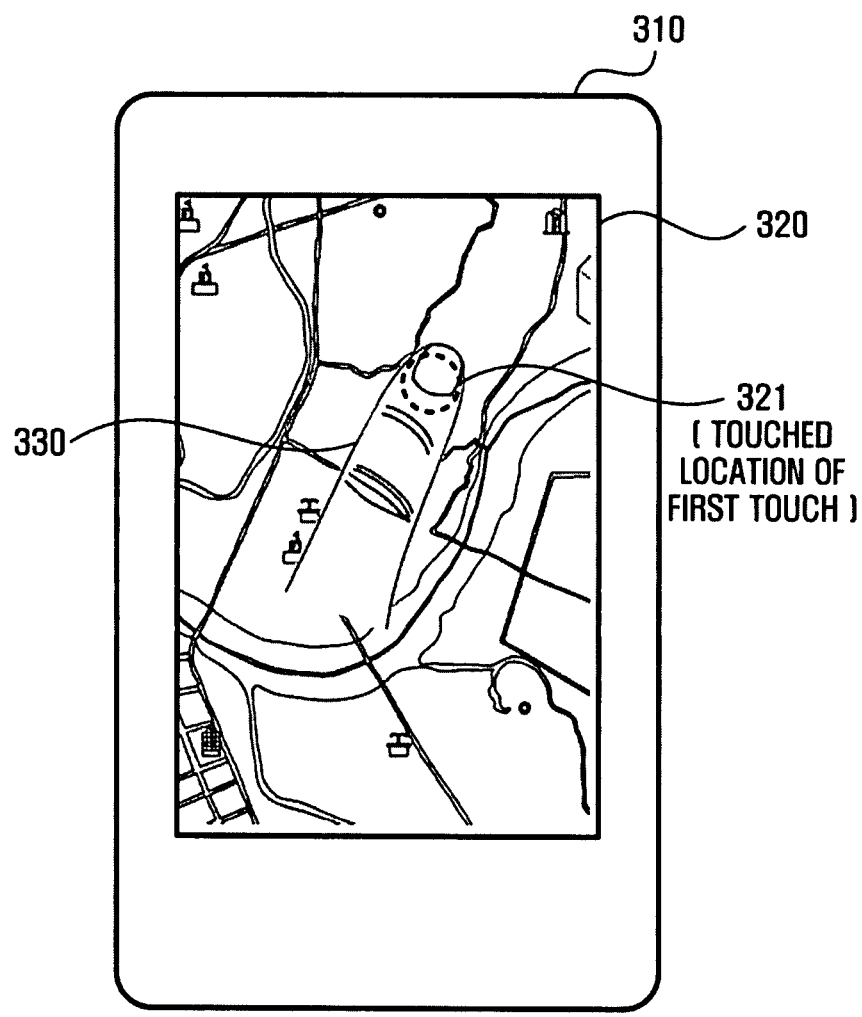

FIGS. 3A and 3B are diagrams illustrating a first touch made by a user according to an embodiment of the present invention.

Referring to FIG. 3A, a map is displayed on a screen 320 of an LBS apparatus 310, and a user touches a desired location 321 on the map with his/her finger 330.

FIG. 3B illustrates the location 321 of a first touch of the desired location 321 illustrated in FIG. 3A, which is touched by the user's finger 330.

In this case, the touch sensing unit 201 senses the first touch and detects the touched location 321 of the first touch.

Figure 3C:
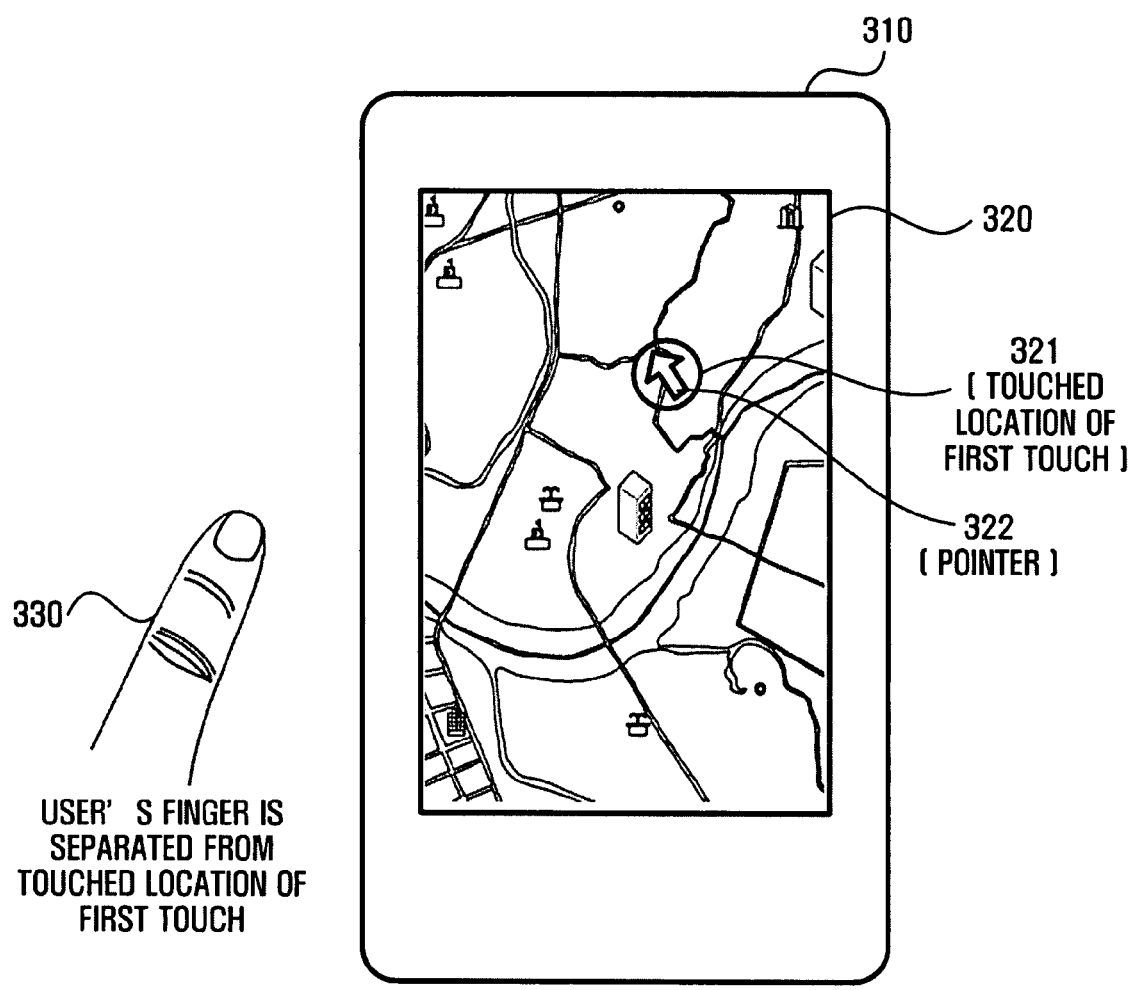
FIG. 3C is a diagram illustrating setting of a pointer according to an embodiment of the present invention.

FIG. 3C is a diagram illustrating setting of a pointer according to an embodiment of the present invention.

Referring to FIG. 3C, the pointer setting unit 202 sets a pointer 322 to the touched location 321 of the first touch, which is detected by the touch sensing unit 201.

At this time, as illustrated in FIG. 3C, the user's finger 330 is separated from the location 321 of the first touch.

The pointer setting unit 202 sets the pointer 322, that is, it places the pointer 322 at the location 321 of the first touch, when the user touches and then stops touching the location 321 of the first touch or when the user touches the location 321 and then moves a predetermined distance from the location 321 of the first touch.

The above operation of the pointer setting unit 202 is closely related to an operation of the touch sensing unit 201 that differentiates the first and second touches from each other, which will later be described with reference to FIG. 3F.

Figure 3D:
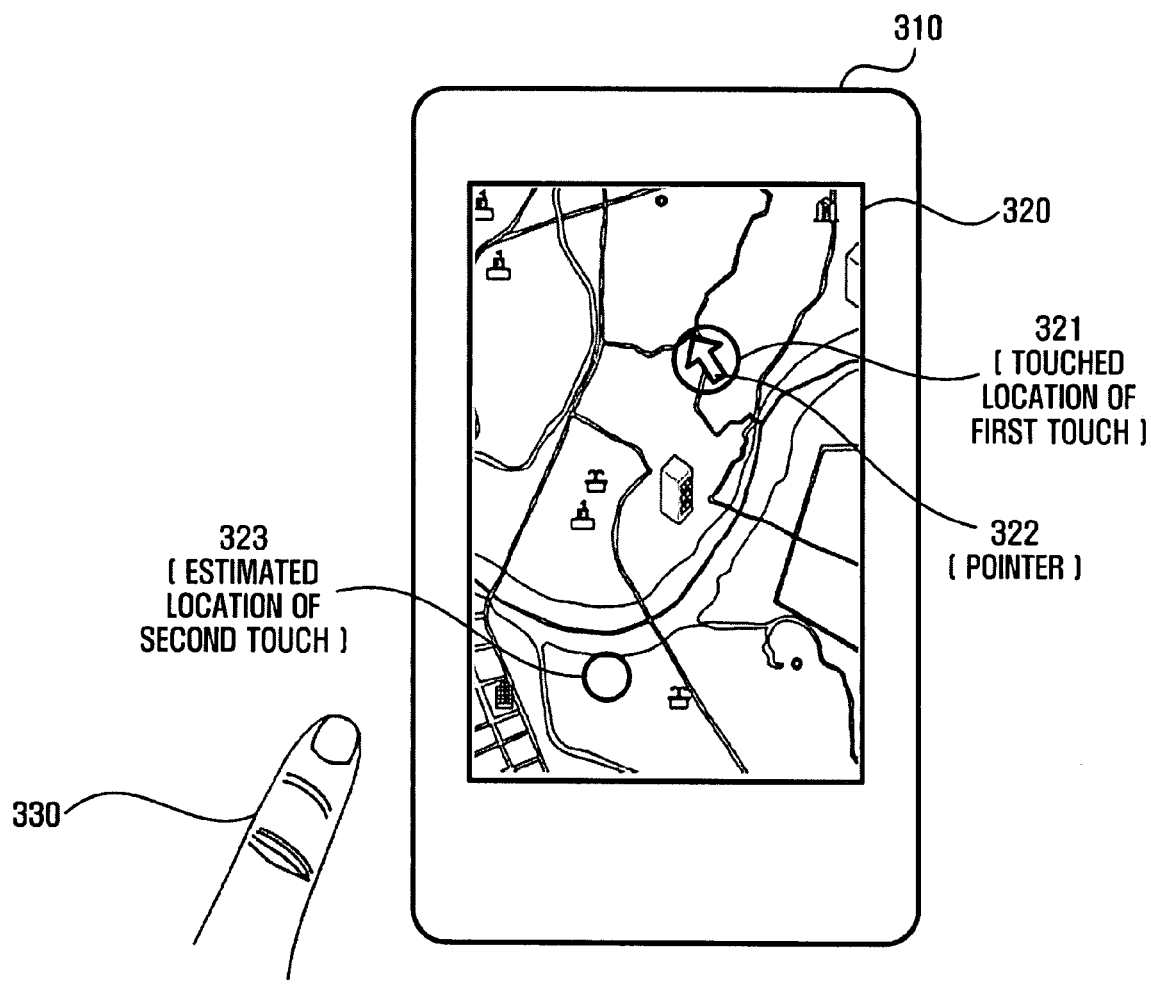
FIGS. 3D and 3E are diagrams illustrating movement of a touched location, which is caused by movement of the location of a second touch, according to an embodiment of the present invention.
Figure 3E:
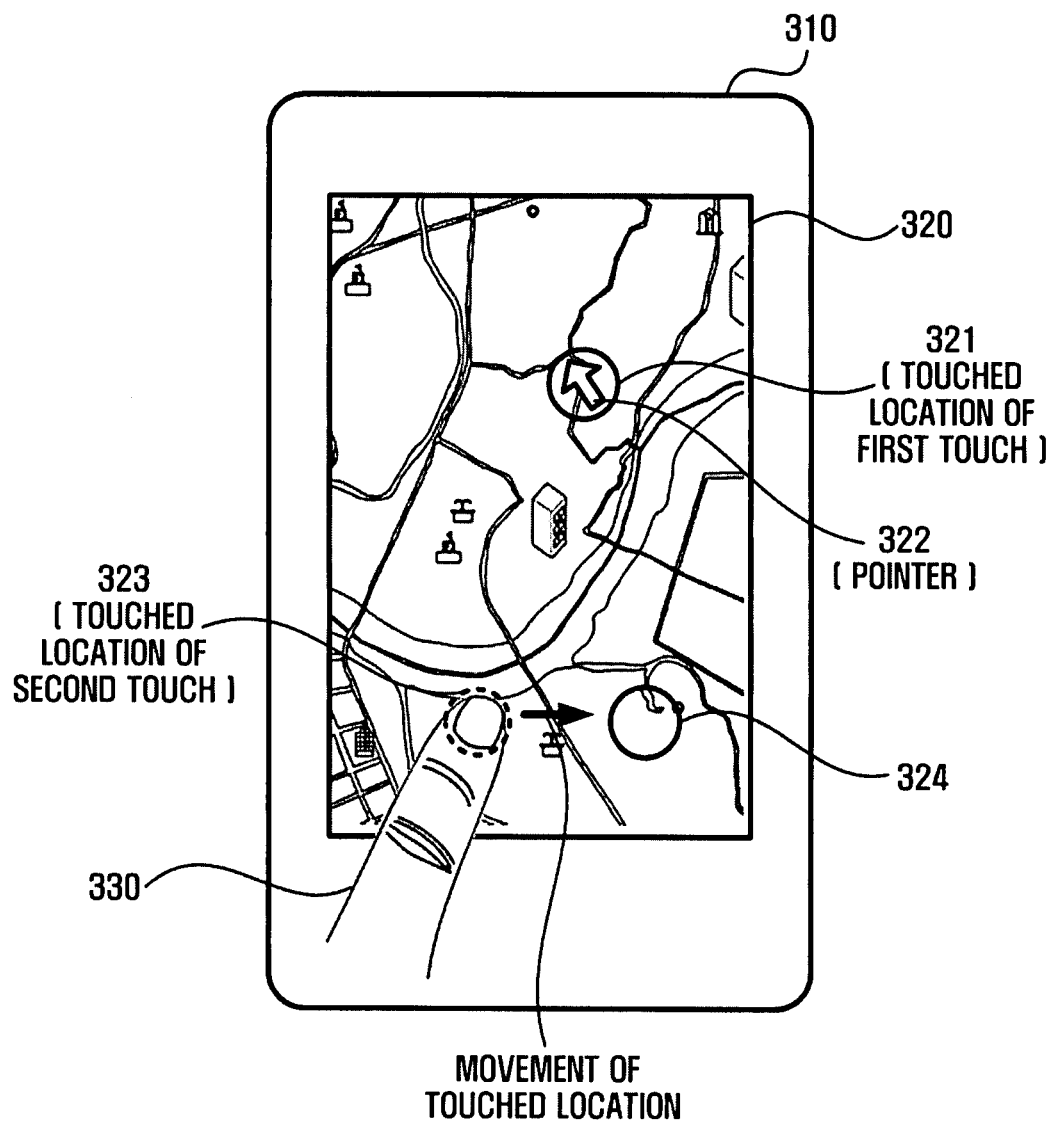

FIGS. 3D and 3E illustrate movement of a touched location, which is caused by movement of the second touch, according to an embodiment of the present invention.

The touch sensing unit 201 sensed the first touch and detected the touched location 321 of the first touch, and the pointer setting unit 202 set the pointer 322 to the touched location 321 of the first touch, as described above with reference to FIGS. 3A through 3C.

Next, when the user determines an estimated location 323 of the second touch on the screen 320 of the LBS apparatus 310 as illustrated in FIG. 3D, and touches the determined location 323 as illustrated in FIG. 3E, the touch sensing unit 201 senses the second touch and detects the touched location 323 of the second touch.

The coordinate transforming unit 203 receives information regarding the touched locations 321 and 323 of the respective first and second touches from the touch sensing unit 201, and transforms movement of the touched location 323 (a location 324 illustrated in FIG. 3E), which is caused by movement of the second touch, into movement of the location of the pointer 322.

Here, the second touch means the user's touch made in order to control movement of the pointer 322 set to the touched location 321 of the first touch. As illustrated in FIG. 3E, the location 323 of the second touch is preferably determined to be a region in which it is convenient to control the movement of the pointer 322 that is set to the location 321 of the first touch on the screen 320 of the LBS apparatus 310.

The touch sensing unit 201 differentiates the first touch and the second touch from each other, with reference to a predetermined instant of time.

For example, as illustrated in FIG. 3C, when after the user's first touch, the user cancels the first touch and touches a new location rather than the location 321 of the first touch, the touch sensing unit 201 recognizes the touch of the new location as the second touch.

Figure 3F:
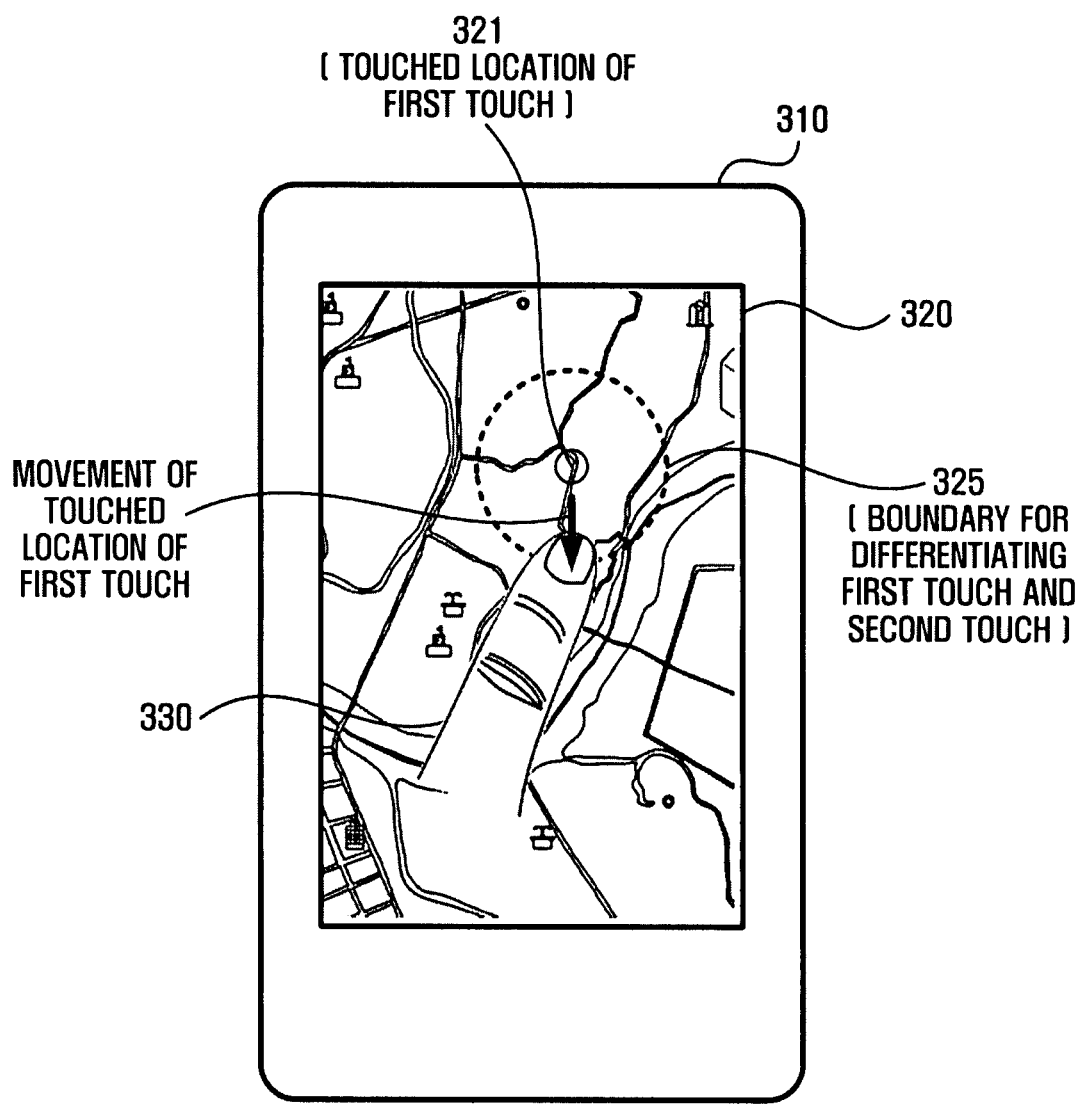
FIG. 3F is a diagram illustrating that a touch sensing unit differentiates the first touch and the second touch from each other, according to an embodiment of the present invention.

FIG. 3F is a diagram illustrates that the touch sensing unit 201 differentiates the first touch and the second touch from each other, according to an embodiment of the present invention.

The touch sensing unit 201 may differentiate the first touch and the second touch from each other, with reference to a predetermined distance.

For example, after the user's first touch, when the user moves the predetermined distance from the first touch while maintaining the first touch, that is, when the user moves to the outside of a predetermined boundary 325 from the location 321 of the first touch, the touch sensing unit 201 recognizes this movement as the second touch.

Also, the touch sensing unit 201 may differentiate the first and second touches from each other, depending on whether a pressure is applied onto the locations of the first and second touches.

For example, if the user makes a first touch and presses the touched location at the same time, a pointer is set to the touched location, and if the user makes a second touch without pressing the touched location, the touch sensing unit 201 recognizes it as the second touch.

Since the touched locations of the first touch and the second touch, that is, the coordinates of the touched locations of the first and second touches, are known, the coordinate transforming unit 203 reflects the coordinates of the location of the second touch, which are changed whenever the user changes the location of the second touch, into the coordinates of the location of the first touch, i.e., into the coordinates of the location of the pointer.

Accordingly, the movement of the location of the user's second touch is transformed into the movement of the location of the pointer.

Figure 3G:
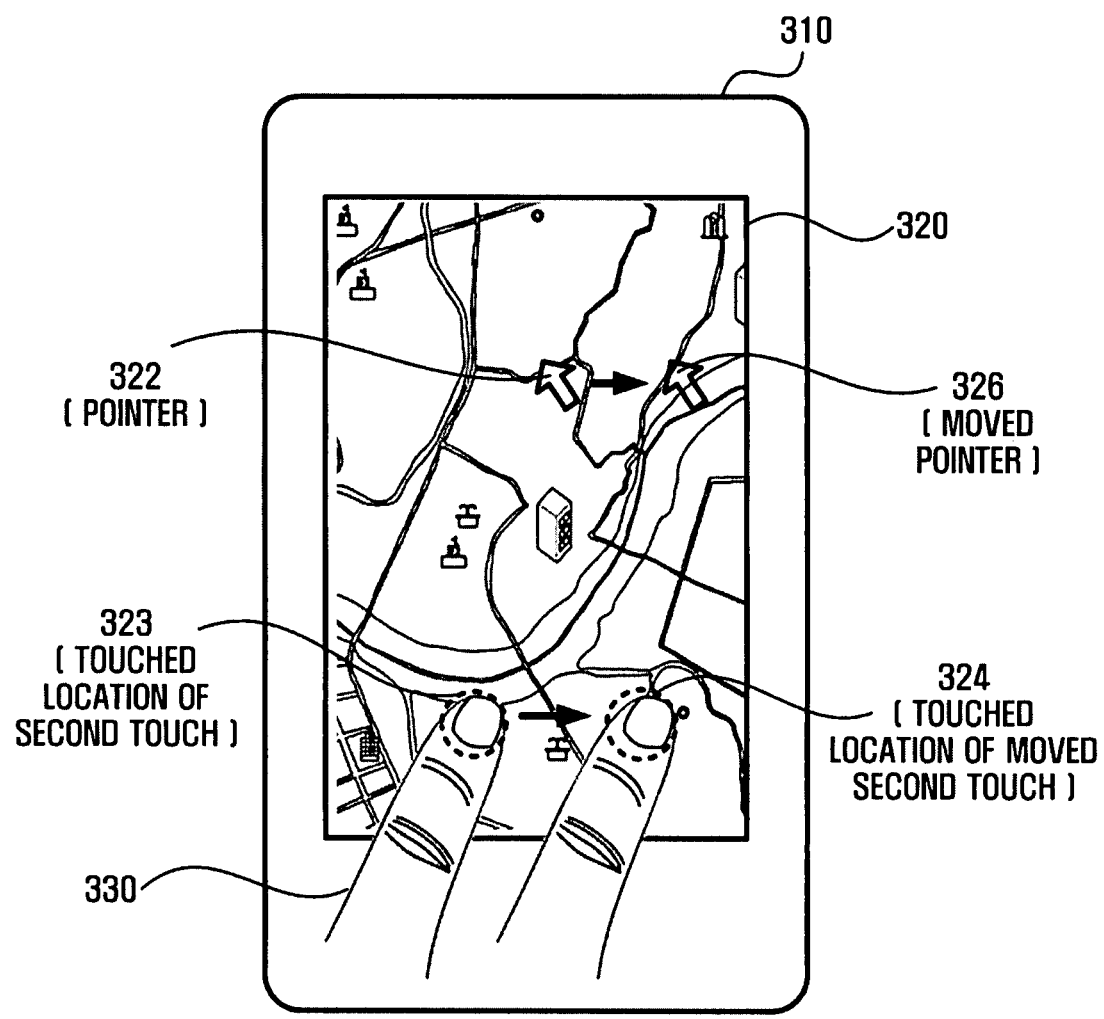
FIG. 3G is a diagram illustrating reflecting of movement of the location of the second touch into movement of the pointer, according to an embodiment of the present invention.

FIG. 3G is a diagram illustrating that the movement of the location of the second touch is reflected into the movement of the location of the pointer, according to an embodiment of the present invention.

If the initial, touched location 323 of the second touch is changed to a new touched location 324, the touch sensing unit 201 detects the coordinates of the new location 324, and reflects in real time the detected coordinates into the coordinates of the pointer 322 that is set to the location of the first touch, thereby moving the pointer 322. FIG. 3G illustrates a pointer 326 that is moved by the coordinate transforming unit 203 as described above.

In this case, the coordinate transforming unit 203 is capable of transforming the movement of the location of the second touch into movement of the location of the pointer at a ratio of 1 to 1.

For example, if the location of the second touch is moved on the screen by 3 cm and in a right direction, the current location of the pointer is also moved on the screen by 3 cm and in a right direction.

The coordinate transforming unit 203 is also capable of transforming the movement of the location of the second touch into the movement of the location of the pointer at a ratio of 1 to N.

For example, the location of the second touch is moved on the screen by 3 cm and in a left direction, the current location of the pointer is moved by 1 cm, 0.5 cm, or less than 0.5 cm and in a left direction according to a ratio of transformation. In this case, even if the scale of a map displayed on a screen of an OBS apparatus is high, it is possible to minutely move the pointer on the map. Further, as not only a screen of each LBS apparatus but also a touch screen of each of most digital apparatuses become smaller and smaller, the present invention allows a pointer to be minutely moved, thereby improving usability of the apparatuses.

Further, the apparatus according to an embodiment of the present invention is capable of not only moving a pointer based on a first touch and a second touch, but also rotating a map by inputting an input of predetermined mode conversion using a button (not shown) or a touch (not shown).

Figure 3H:
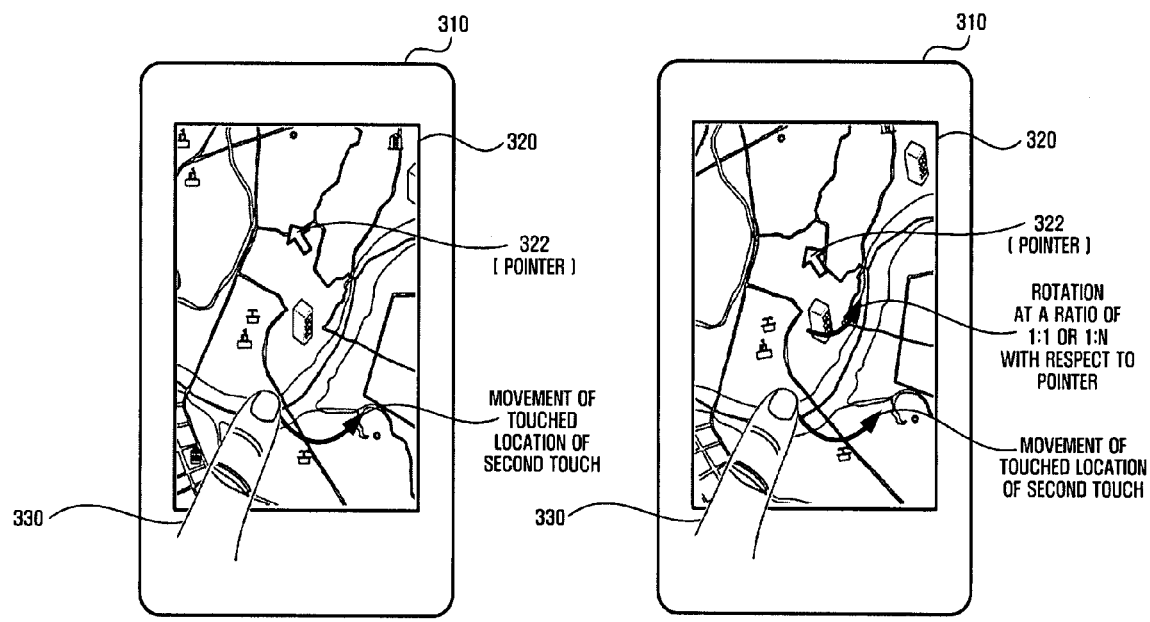
FIG. 3H is a diagram illustrating a method of rotating a map according to an embodiment of the present invention.

FIG. 3H is a diagram illustrating a method of rotating a map, according to an embodiment of the invention.

As illustrated in FIG. 3E, if the touch sensing unit 201 senses the first touch and detects the touched location 321 of the first touch, the pointer setting unit 202 sets the pointer 322 to the location 321 of the first touch, and the second touch is made, a user can rotate a map to a desired extent by using a rotation conversion button (not shown) or a touch activator for rotation conversion (not shown).

In this case, as illustrated in FIG. 3H, the map is rotated with respect to the location 321 of the first touch, and the user can adjust the extent of the rotation by moving the location of the second touch.

The coordinate transforming unit 203 is capable of precisely adjusting the rotation of the map with respect to the pointer according to the movement of the location of the second touch, at the above ratio of the movement of the location of the second touch to the movement of the location of the pointer, e.g., at a ratio of 1 to 1 or a ratio of 1 to N.

The pressure sensing unit 204 senses pressures applied onto the locations of the first and second touches, which are detected by the touch sensing unit 201 to instruct an operation corresponding to each of the sensed pressures to be performed.

Also, the pressure sensing unit 204 may instruct an operation corresponding to the sensed pressure to be performed according to the duration and intensity of the sensed pressure.

For example, when a zoom-in operation or a zoom-out operation is to be performed on the map, the speed of the zoom-in operation or the zoom-out operation may be controlled according to the intensity of the pressure.

If the pressure is low, it is possible to reduce the speed of the zoom-in operation or the zoom-out operation, and if the pressure is high, it is possible to increase the speed of the zoom-in operation or the zoom-out operation.

Figure 3I:
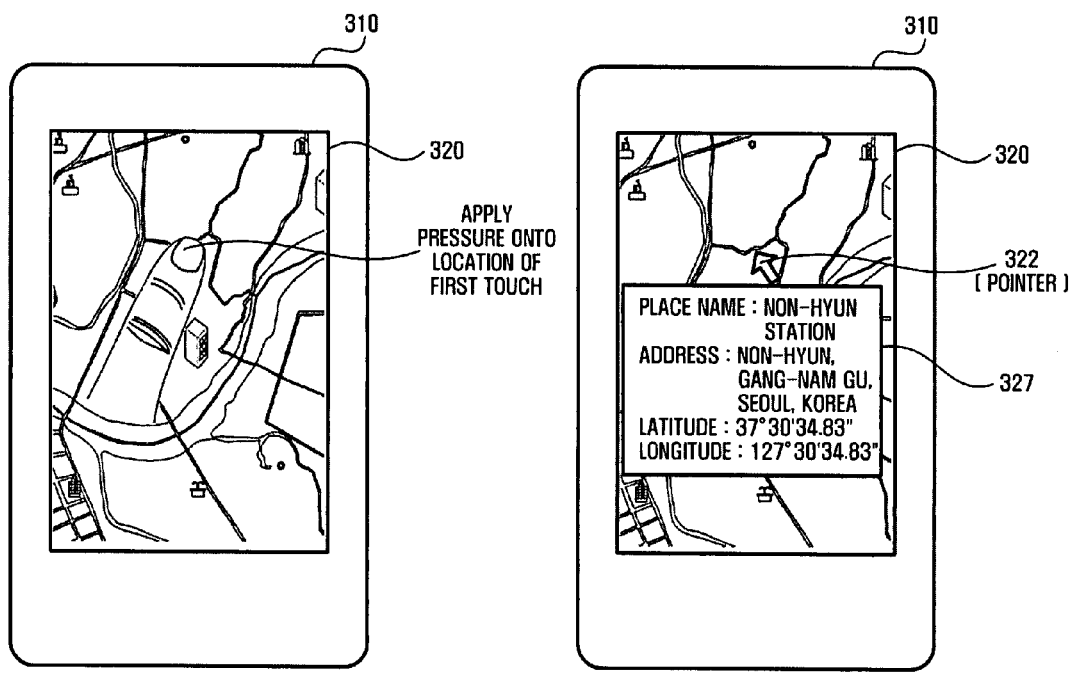
FIGS. 3I and 3J are diagrams illustrating how an operation to be performed is instructed by a pressure sensing unit according to an embodiment of the present invention.
Figure 3J:
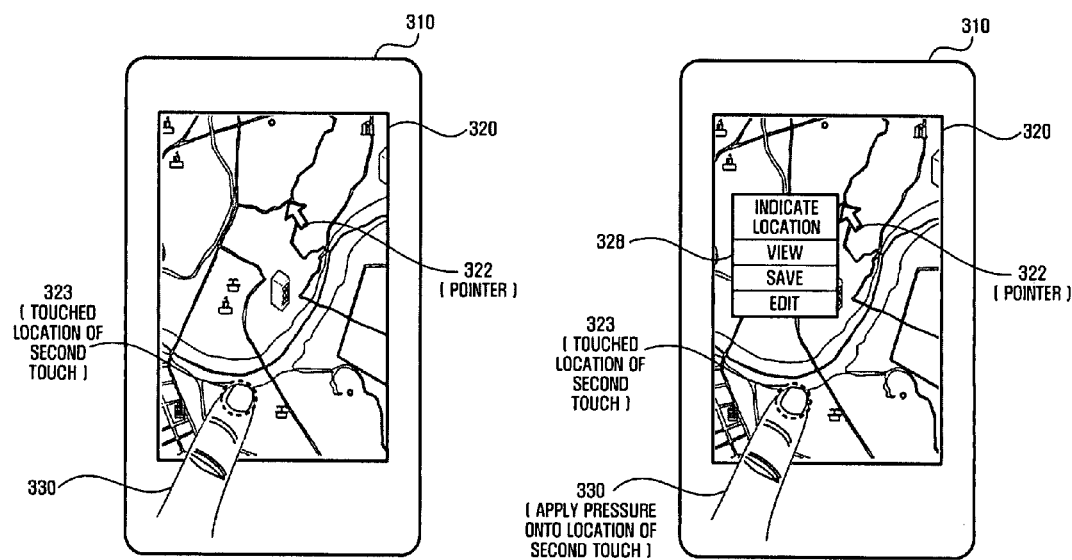

FIGS. 3I and 3J are diagrams illustrating how an operation to be performed is instructed by a pressure sensing unit according to an embodiment of the present invention.

For example, when after a first touch, a pressure is applied onto the touched location of the first touch without moving the location of the first touch for a predetermined duration of time, the pressure sensing unit 204 requests the display unit 205 to display information 327 regarding the location of the first touch on a map as illustrated in FIG. 3I.

Here, the information 327 may include the name, address, latitude, and longitude of the location of the first touch.

Also, if after a second touch, a pressure is applied onto the touched location of the second touch without moving the location of the second touch for a predetermined duration of time, the pressure sensing unit 204 may present an effect of clicking a left button or a right button of a mouse.

For example, when after the second touch, a pressure is applied onto the touched location of the second touch without moving the location of the second touch, it is possible to obtain an effect of clicking the left button of a mouse. Also, as illustrated in FIG. 3J, when after a second touch, a pressure is applied onto the location of the second touch without moving the location of the second touch for a predetermined duration of time, e.g., for 2 seconds, an effect of clicking the right button of the mouse is achieved thus popping up an attribute window 328.

The duration and intensity of a pressure applied according to the present invention may be determined in various manners, without being intended to be limiting.

Figure 4:
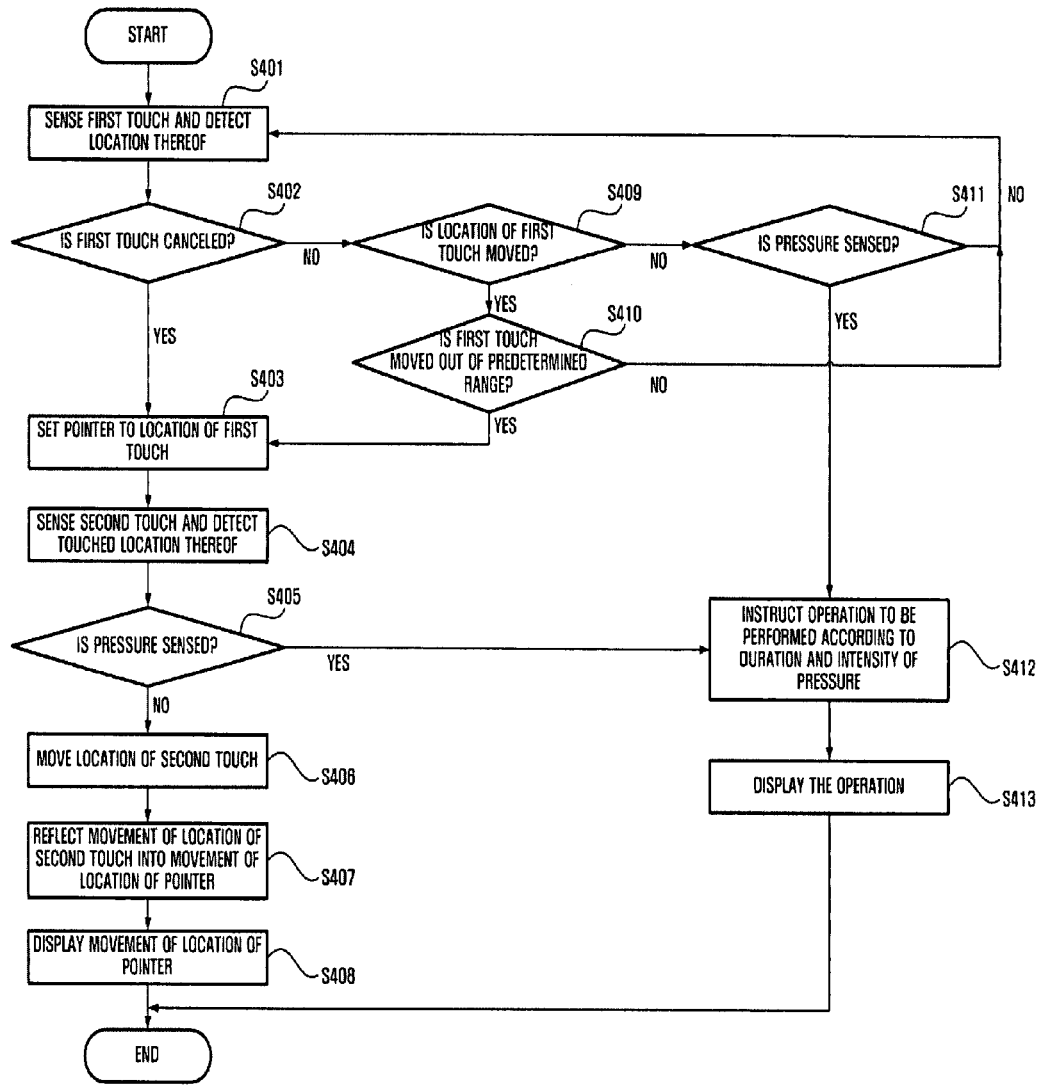
FIG. 4 is a flowchart illustrating a method of improving usability of a touch screen, according to an embodiment of the present invention.

FIG. 4 is a flowchart illustrating a method of improving usability of a touch screen, according to an embodiment of the present invention.

The flowchart, of FIG. 4, illustrating a method of improving usability of a touch screen according to an embodiment of the present invention, will now be described with reference to FIG. 2.

The touch sensing unit 201 senses a user's first touch and detects the touched location of the first touch (S401). After operation S401, the touch sensing unit 201 determines whether the first touch is canceled (S402).

If it is determined in operation S402 that the first touch is canceled, the pointer setting unit 202 sets a pointer to the location of the first touch (S403).

After operation S403, the touch sensing unit 201 senses the user's second touch and detects the touched location of the second touch (S404).

In this case, the touch sensing unit 201 can recognize the second touch, since it is made after the first touch is canceled, that is, since it is made a predetermined interval of time after the first touch.

After operation S404, the pressure sensing unit 204 determines whether a pressure is applied onto the location of the second touch (S405).

If it is determined in operation S405 that a pressure is not applied, the touch sensing unit 201 senses movement of the user's second touch, and detects the location of the moved second touch (S406).

If it is determined in operation S405, that a pressure is applied onto the location of the second touch, the pressure sensing unit 204 performs operations S412 and S413 which will later be described.

After operation S406, the coordinate transforming unit 203 reflects the movement of the location of the second touch determined in operation S405 by transforming the movement of the location of the second touch into movement of the pointer (S407).

In this case, the coordinate transforming unit 203 is capable of precisely controlling the movement of the pointer based on the second touch by reflecting the movement of the pointer with respect to the movement of the second touch at a ratio of 1 to 1 or at a ratio of 1 to N.

After operation S407, the movement of the pointer is displayed on the display unit 205 (S408). If it is determined in operation S402 that the first touch is not canceled, the touch sensing unit 201 determines whether the location of the first touch is moved (S409).

If it is determined in operation S409 that the first touch is moved to the outside of a predetermined range, the touch sensing unit 201 determines this movement as the second touch and the pointer setting unit 202 sets a pointer to the original location of the first touch (S410).

If it is determined in operation S409 that the movement of the first touch falls within the predetermined range, the touch sensing unit 201 continuously senses the first touch and detects the touched location of the first touch.

If it is determined in operation S409 that the location of the first touch is not moved, the pressure sensing unit 204 determines whether a pressure is applied onto the location of the first touch (S411).

If it is determined in operation S411 that a pressure is applied, the duration and intensity of the applied pressure are detected, and performing of an operation corresponding to the detected duration and intensity of the pressure is instructed (S412).

After operation S412, the display unit 205 displays the instructed operation (S413).

The above apparatus and method for improving usability of a touch screen according to the present invention have one or more advantages as follows.

The present invention has an advantage of preventing a desired screen image from being partially hidden by part of a user's body, e.g., a finger, or a tool, such as a stylus pen.

Also, it is possible to precisely control movement of a pointer or an operation that is to be performed using the pointer, based on a first touch and a second touch.

Also, it is possible to precisely control movement of a pointer or an operation that is to be performed using a pointer without enlarging the size of a screen image, thereby minimizing the size of an LBS apparatus.

While the present invention has been particularly shown and described with reference to exemplary embodiments thereof, it will be understood by those of ordinary skill in the art that various changes in form and details may be made therein without departing from the spirit and scope of the present invention as defined by the following claims. It is therefore desired that the present embodiments be considered in all respects as illustrative and not restrictive, reference being made to the appended claims rather than the foregoing description to indicate the scope of the invention.

What is claimed is:

1. An apparatus for improving usability of a touch screen, the apparatus comprising:
a touch sensor to sense a first touch and a second touch, and to detect touched locations of the sensed touches;
a pointer setting unit, comprising a processor, to set a pointer to the detected location of the first touch; and
a coordinate transforming unit, comprising a processor, to move a location of the pointer from the detected location of the first touch to a new location, in response to movement of the second touch,
wherein the touch sensor differentiates the first touch and the second touch from each other with reference to a predetermined interval of time between the first touch and second touch,
wherein the pointer remains at the detected location of the first touch when the second touch is detected at a location different from a location of the first touch.

2. The apparatus of claim 1, further comprising a pressure sensor to sense pressure applied to the locations of the sensed touches to instruct an operation corresponding to the sensed pressure to be performed.

3. The apparatus of claim 2, wherein the operation instructed by the pressure sensor is performed according to one of a duration and intensity of the sensed pressure.

4. The apparatus of claim 1, wherein the coordinate transforming unit transforms movement of the second touch to the new location, into movement of the location of the pointer, at a ratio of 1 to 1.

5. The apparatus of claim 1, wherein the coordinate transforming unit transforms movement of the second touch to the new location, into movement of the location of the pointer, at a ratio of 1 to N.

6. A method of improving usability of a touch screen, the method comprising:
sensing a first touch, and detecting a touched location of the sensed first touch;
setting a pointer to the detected location of the first touch;
sensing a second touch, and detecting a touched location of the sensed second touch; and
moving a location of the pointer from the detected location of the first touch to a new location, in response to movement of the second touch,
wherein the sensing of the second touch comprises differentiating the first touch and the second touch from each other with reference to a predetermined interval of time between the first touch and second touch,
wherein the pointer remains at the detected location of the first touch when the second touch is detected at a location different from a location of the first touch.

7. The method of claim 6, further comprising sensing a pressure applied to the touched location to instruct an operation corresponding to the sensed pressure to be performed.

8. The method of claim 7, wherein the operation instructed in the sensing of the pressure is performed according to one of a duration and intensity of the sensed pressure.

9. The method of claim 6, wherein the moving a location of the pointer comprises transforming movement of the second touch to the new location into movement of the location of the pointer, at a ratio of 1 to 1.

10. The method of claim 6, wherein the moving a location of the pointer comprises transforming movement of the second touch to the new location, into movement of the location of the pointer, at a ratio of 1 to N.

11. A non-transitory computer readable medium storing computer readable instructions that control at least one processor to implement the method of claim 6.

12. An apparatus for improving usability of a touch screen, the apparatus comprising:
a touch sensor to sense a first touch and a second touch, and to detect touched locations of the sensed touches;
a pointer setting unit, comprising a processor, to set a pointer to the detected location of the first touch; and
a coordinate transforming unit, comprising a processor, to move a location of the pointer from the detected location of the first touch to a new location, in response to movement of the second touch,
wherein the touch sensor differentiates the first touch and the second touch from each other with reference to a predetermined boundary located a predetermined distance from the detected location of the first touch,
wherein the touch sensor senses the second touch if the second touch is outside the predetermined boundary,
wherein the pointer remains at the detected location of the first touch when the second touch is detected at a location different from a location of the first touch.

13. A method of improving usability of a touch screen, the method comprising:
sensing a first touch, and detecting a touched location of the sensed first touch;
setting a pointer to the detected location of the first touch;
sensing a second touch, and detecting a touched location of the sensed second touch; and
moving a location of the pointer from the detected location of the first touch to a new location, in response to movement of the second touch,
wherein the sensing of the second touch comprises differentiating the first touch and the second touch from each other with reference to a predetermined boundary located a predetermined distance from the detected location of the first touch,
wherein the second touch is sensed if the second touch is outside the predetermined boundary,
wherein the pointer remains at the detected location of the first touch when the second touch is detected at a location different from a location of the first touch.

14. The apparatus of claim 1, wherein the coordinate transforming unit adjusts a rotation of a display of the touch screen with respect to the pointer, according to a movement of the location of the second touch.

15. The method of claim 6, further comprising adjusting a rotation of a display of the touch screen with respect to the pointer, according to a movement of the location of the second touch.

16. The apparatus of claim 1, wherein the coordinate transforming unit moves the location of the pointer by reflecting a change in coordinates of the second touch due to movement of the second touch to the new location, into a change in coordinates corresponding to the location of the pointer.

17. The apparatus of claim 1, wherein the second touch controls movement of the pointer, the second touch is at a location different from the location of the pointer and the location of the first touch, and the second touch location is separated from the first touch location and the pointer by a predetermined distance.

18. The apparatus of claim 1, wherein the first touch and second touch are input to the touch screen using an object, and the object is separated from the touch screen between the first touch and the second touch.

19. The apparatus of claim 1, wherein the first touch and second touch are input to the touch screen using an object, and the pointer setting unit sets the pointer at the location of the first touch when the object stops touching the location of the first touch or when the object touches the location of the first touch and then moves a predetermined distance from the location of the first touch.

20. The method of claim 6, wherein the moving a location of the pointer comprises reflecting a change in coordinates of the second touch due to movement of the second touch to the new location, into a change in coordinates corresponding to the location of the pointer.

21. A method of improving usability of a touch screen, the method comprising:
   sensing a first touch at a first location of the touch screen;
   setting a pointer to the first location;
   sensing a second touch at a second location of the touch screen;
   moving the pointer from the first location to a new location of the touch screen in response to a change in location of the second touch from the second location,
   wherein the pointer remains at the first location when the second touch is sensed at the second location, the second location being different from the first location.

22. The method of claim 21, wherein the moving the pointer comprises changing coordinates corresponding to a location of the pointer in proportion to a change in coordinates of the second location, when the pointer is moved to the new location.

23. A method of improving usability of a touch screen, the method comprising:
   sensing a first touch at a first location of the touch screen;
   setting a pointer to the first location;
   sensing a second touch at a second location of the touch screen;
   moving the pointer from the first location to a new location of the touch screen by changing coordinates corresponding to the first location of the pointer to coordinates corresponding to the new location, the change in coordinates being in proportion and in response to a change in coordinates of the second location due to movement of the second touch,
   wherein the pointer remains at the first location when the second touch is sensed at the second location, the second location being different from the first location.

24. The method of claim 23, wherein movement of the second touch comprises sensing a third touch at a third location, the third location being different from the new location, and the pointer is moved to the new location upon sensing the third touch.

* * * * *